(12) United States Patent
Rippel et al.

(10) Patent No.: US 11,570,465 B2
(45) Date of Patent: Jan. 31, 2023

(54) MACHINE-LEARNED IN-LOOP PREDICTOR FOR VIDEO COMPRESSION

(71) Applicant: WaveOne Inc., Palo Alto, CA (US)

(72) Inventors: Oren Rippel, Vancouver (CA); Alexander G. Anderson, Mountain View, CA (US); Kedar Tatwawadi, Mountain View, CA (US); Sanjay Nair, Fremont, CA (US); Craig Lytle, Los Altos Hills, CA (US); Hervé Guihot, Mountain View, CA (US); Brandon Sprague, Mountain View, CA (US); Lubomir Bourdev, Mountain View, CA (US)

(73) Assignee: WaveOne Inc., Palo Alto, CA (US)

( * ) Notice: Subject to any disclaimer, the term of this patent is extended or adjusted under 35 U.S.C. 154(b) by 0 days.

(21) Appl. No.: 17/411,385

(22) Filed: Aug. 25, 2021

(65) Prior Publication Data

US 2022/0224934 A1     Jul. 14, 2022

Related U.S. Application Data

(60) Provisional application No. 63/136,648, filed on Jan. 13, 2021.

(51) Int. Cl.
| | |
|---|---|
| *H04N 19/52* | (2014.01) |
| *H04N 19/105* | (2014.01) |
| *H04N 19/176* | (2014.01) |
| *H04N 19/30* | (2014.01) |
| *G06N 3/08* | (2006.01) |
| *H04N 19/114* | (2014.01) |
| *H04N 19/149* | (2014.01) |
| *H04N 19/166* | (2014.01) |

(Continued)

(52) U.S. Cl.
CPC ............... *H04N 19/52* (2014.11); *G06N 3/04* (2013.01); *G06N 3/08* (2013.01); *H04N 19/105* (2014.11); *H04N 19/114* (2014.11); *H04N 19/149* (2014.11); *H04N 19/166* (2014.11); *H04N 19/172* (2014.11); *H04N 19/176* (2014.11); *H04N 19/30* (2014.11); *H04N 19/65* (2014.11)

(58) Field of Classification Search
CPC .... H04N 19/52; H04N 19/105; H04N 19/176; H04N 19/30; G06N 3/08
See application file for complete search history.

(56) References Cited

U.S. PATENT DOCUMENTS

| | | | |
|---|---|---|---|
| 2019/0297326 A1* | 9/2019 | Reda | G06N 20/10 |
| 2022/0094962 A1* | 3/2022 | Choi | H04N 19/136 |

* cited by examiner

*Primary Examiner* — Jae N Noh
(74) *Attorney, Agent, or Firm* — Fenwick & West LLP

(57) ABSTRACT

A compression system trains a compression model for an encoder and decoder. In one embodiment, the compression model includes a machine-learned in-loop flow predictor that generates a flow prediction from previously reconstructed frames. The machine-learned flow predictor is coupled to receive a set of previously reconstructed frames and output a flow prediction for a target frame that is an estimation of the flow for the target frame. In particular, since the flow prediction can be generated by the decoder using the set of previously reconstructed frames, the encoder may transmit a flow delta that indicates a difference between the flow prediction and the actual flow for the target frame, instead of transmitting the flow itself. In this manner, the encoder can transmit a significantly smaller number of bits to the receiver, improving computational efficiency.

16 Claims, 7 Drawing Sheets

(51) Int. Cl.
*H04N 19/172* (2014.01)
*H04N 19/65* (2014.01)
*G06N 3/04* (2006.01)

MACHINE-LEARNED IN-LOOP PREDICTOR FOR VIDEO COMPRESSION

CROSS-REFERENCE TO RELATED APPLICATIONS

This application claims the benefit of provisional U.S. Application No. 63/136,648, filed on Jan. 13, 2021, which is incorporated by reference herein in its entirety.

BACKGROUND

This invention generally relates to encoding and decoding videos, and more specifically to encoding and decoding videos using a machine learned in-loop flow predictor.

Various online systems transmit information to and from one another over a network. The information may be in the form of images, videos that include a sequence of frames, or text. A sender typically encodes the information using an encoder into a compressed form, and the compressed information is transmitted to the receiver. The receiver can then decode the compressed information using a decoder to reconstruct the original information. A video typically includes a sequence of image frames that capture the motion of objects and background of a scene that occur due to movement of the camera or movement of the objects themselves. Compared to other types of information, video compression can be challenging due to large file size and issues such as video and audio synchronization. Video compression for lower-power devices, such as smartphones, can be even more challenging.

SUMMARY

A compression system trains a compression model for an encoder and decoder. In one embodiment, the compression model includes a machine-learned in-loop flow predictor that generates a flow prediction from previously reconstructed frames. The machine-learned flow predictor is coupled to receive a set of previously reconstructed frames and output a flow prediction for a target frame that is an estimation of the flow for the target frame. In particular, since the flow prediction can be generated by the decoder using the set of previously reconstructed frames, the encoder may transmit a flow delta that indicates a difference between the flow prediction and the actual flow for the target frame, instead of transmitting the flow itself. In this manner, the encoder can transmit a significantly smaller number of bits to the receiver, improving computational efficiency.

Specifically, one way to encode a target frame in a sequence of video frames is to characterize the target frame as a combination of a flow and a residual frame. The flow describes changes in one or more characteristics of a scene from a previously reconstructed frame to a current target frame. The flow can be applied to the previously reconstructed frame to generate a compensated frame that resembles the target frame but may not include some details of the target frame. Thus, the residual frame describes the residual difference between the target frame and the compensated frame. An encoder may encode the flow and residual frame for a target frame and transmit the compressed information to a decoder, such that the decoder can reconstruct the target frame. This process is repeated for the next frame in the sequence.

For example, the flow may be optical flow that describes the motion displacement of a block of pixels from the previously reconstructed frame to a corresponding block in the current target frame that contains the same portion of the scene (e.g., person riding a motorcycle). The displacement reflects the movement of the portion of the scene from the previously reconstructed frame to the target frame. In such an instance, the flow may be represented in the form of a motion vector that indicates the direction and magnitude of the change from the previously reconstructed frame to the target frame. The compensated frame is generated by displacing each block in the previously reconstructed frame based on the motion vectors, and the residual frame is generated by computing a difference between the compensated frame and the target frame.

In many instances, the flow for a set of previously reconstructed frames can be a good estimate of the flow for the target frame. This is because changes in a given scene share considerable redundancy. For example, when the flow is optical flow, consecutive frames share redundancy due to the linearity of motion. As an example, the motion vector for a block containing a moving cyclist in a set of previously reconstructed frames may be a good estimate for the motion vector for the target frame because the motion of the cyclist is displaced by similar amounts in both scenes. By using the in-loop flow predictor, the decoder can predict the flow for a target frame to a reasonable accuracy using information already available on the decoder side, and the flow for the target frame can be further refined by the flow delta transmitted from the encoder.

Figure 1A:
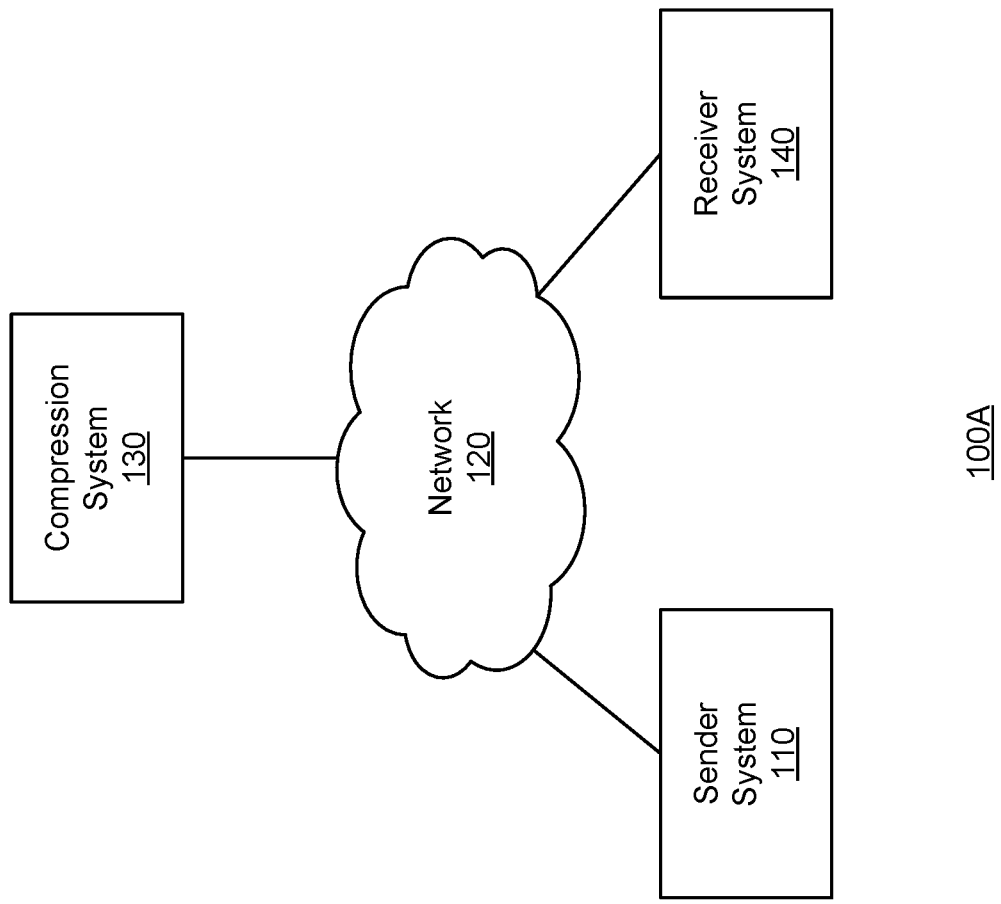
FIG. 1A is a block diagram of a system environment including a compression system, a sender system, and a receiver system, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

The figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "client device 110" in the text refers to reference numerals "client device 110A" and/or "client device 110B" in the figures).

DETAILED DESCRIPTION

Overview

FIG. 1A is a block diagram of a system environment 100A including a compression system 130, a sender system 110, and a receiver system 140, in accordance with an embodiment. As described in further detail, the sender system 110 includes an encoder, and the receiver system 140 includes a decoder. The encoder and decoder may be trained and provided by the compression system 130. In alternative configurations, different and/or additional components may be included in the system environment 100A.

The compression model 130 trains a compression model to generate an encoder and a decoder. The encoder can be used by a sender system 110 to encode information, such as images, videos, and text, into a compressed form. The compressed information can be transmitted to a receiver system 140, for example, in the form of a bitstream. The decoder can be used by the receiver system 140 to reconstruct the original information based on the bitstream provided by the sender system 110. Specifically, after training the parameters of the compression model, certain components of the compression model make up the encoder and the decoder.

In one particular embodiment referred throughout the specification, the information to be encoded and decoded is a video that includes a sequence of frames. The sequence of frames are typically images of the same dimensionality, and capture motions that occur within a scene over time due to movement of the camera or the movement of the objects themselves. Specifically, motions are animated as the positions of pixels that correspond to a particular portion of the scene change throughout the sequence of frames. For example, the movement of a pedestrian walking in the left direction may be animated as the position of the pedestrian gradually shifts toward the left side of the frames. However, it is also appreciated that in other embodiments, the information can be data other than videos, such as a sequence of texts in a document.

In general, video frames, or other types of data derived from video frames may be represented as a tensor. As defined herein, a tensor denotes a multi-dimensional array of values having a width, height, and one or more channels across the depth of the tensor. Thus, a video frame in RGB color may be represented as a tensor with 3 channels, each channel including pixel intensity values for a respective color. As another example, a video frame in grayscale may be represented as a tensor with 1 channel representing pixel intensity values in grayscale. As defined herein, a "position" of an element or pixel in a tensor denotes the position within the width and height of the tensor. Thus, an element at a particular position of a tensor may have a set of values associated with the element that corresponds to the number of channels of the tensor.

In one embodiment, the compression model includes a machine-learned in-loop flow predictor that generates a flow prediction from previously reconstructed frames. As defined in the remainder of the specification, previous reconstructed frames may refer to one or more frames that were reconstructed before a target frame, regardless of whether the previous reconstructed frames are presented temporally earlier or after than the target frame in a video. The machine-learned flow predictor is coupled to receive a set of previously reconstructed frames and output a flow prediction for a target frame that is an estimation of the flow for the target frame. The flow predictor may be included in each of the encoder and the decoder. Thus, for a target frame, the decoder can generate a flow prediction using a set of previously reconstructed frames that are already available to the decoder at that time. To refine the flow for the target frame, the encoder transmits a flow delta that indicates a difference between the flow prediction and the flow for the target frame, instead of transmitting the flow itself. In this manner, the encoder can transmit a smaller number of bits to the receiver, improving computational efficiency.

Specifically, one way to encode a target frame in a sequence of video frames is to characterize the target frame as a combination of a flow and a residual frame. The flow describes changes in one or more characteristics of a scene from a previously reconstructed frame to a current target frame. The flow can be applied to the previously reconstructed frame to generate a compensated frame that resembles the target frame but may not include some details of the target frame. Thus, the residual frame describes the residual difference between the target frame and the compensated frame. An encoder may encode the flow and residual frame for a target frame and transmit the compressed information to a decoder, such that the decoder can reconstruct the target frame. This process is repeated for the next frame in the sequence.

For example, the flow may be optical flow that describes the motion displacement of a block of pixels from the previously reconstructed frame to a corresponding block in the current target frame that contains the same portion of the scene (e.g., person riding a motorcycle). The displacement reflects the movement of the portion of the scene from the previously reconstructed frame to the target frame. In such an instance, the flow may be represented in the form of a motion vector that indicates the direction and magnitude of the change from the previously reconstructed frame to the target frame. The compensated frame is generated by displacing each block in the previously reconstructed frame based on the motion vectors, and the residual frame is generated by computing a difference between the compensated frame and the target frame.

In many instances, the flow for a set of previously reconstructed frames can be a good estimate of the flow for the target frame. This is because changes in a given scene share considerable redundancy. For example, when the flow is optical flow, consecutive frames share redundancy due to the linearity of motion (e.g., constant or similar velocity between frames). For example, the motion vector for a block containing a moving cyclist in a set of previously reconstructed frames may be a good estimate for the motion vector for the target frame because the motion of the cyclist is displaced by similar amounts in one frame to another. By using the flow predictor, the decoder can predict the flow for a target frame to a reasonable accuracy using information already available to the decoder, and the flow for the target frame can be further refined by the flow delta transmitted from the encoder with a smaller number of bits.

In one embodiment, like the image frames of a video, the flow and the flow prediction may be represented as a multi-dimensional tensor (e.g., 2-D or 3-D tensor). Moreover, while the flow for a target frame will be primarily described with respect to motion flow, it is appreciated that flow, and thus, also the flow prediction refer to changes in any other characteristics of a scene over time other than motion. In one instance, the flow may refer to changes in RGB or greyscale intensity values for one or more pixels from a previously reconstructed frame to a current frame. For example, consecutive frames of a scene that capture certain lighting effects (e.g., candlelight getting brighter or dimmer over time) may share considerable redundancy in how pixel intensity values change from one frame to another since change in pixel intensity values indicating light getting brighter or dimmer is likely to continue for the following frames. In such an instance, a flow prediction for a target frame that estimates change in pixel intensity values for a target frame based on a set of previously reconstructed frames is a good estimate for the actual flow, as pixel intensity values for the lighting may change at similar rates from one frame to another.

Moreover, it is also appreciated that different types of information represented by the flow and the flow prediction for a given frame can be combined in any form. For example, the flow and the flow prediction for a pixel may represent a combination of changes in motion displacement and pixel intensity values from a previously reconstructed frame to a target frame. In such an example, the flow and flow prediction for the pixel may be represented as a concatenation of a motion vector (e.g., 2-D vector for x and y motion) that specifies the changes in motion and a pixel intensity vector (e.g. 3-D vector for red, green, and blue intensity values) that specifies the changes in pixel intensity values from a previously reconstructed frame to the target frame. Thus, in this example, the flow and flow prediction for the target frame may be represented as a 5-D vector.

In yet another example, the flow or flow prediction may incorporate an element for encoding parameter values such as a confidence value for the flow for one or more respective pixels. For instance, the optical flow for a pixel may be represented as a 3-D vector including a 2-D motion vector and an element indicating the confidence value of the flow. In such an instance, the flow or flow prediction may be applied to a previously reconstructed frame such that the intensity value for a particular pixel or group of pixels (e.g., block of pixels) for an optical flow vector is blurred to a degree that is inversely proportional to the confidence value for that pixel to generate a blurred version of the pixel. For example, the particular pixel or block of pixels may be blurred by computing the average or weighted average value of the pixels in the neighborhood (e.g., pixels at top, bottom, right, left of the particular pixel) of the particular pixel. Thus, when the confidence value is a maximum value (e.g., 1), the flow or flow prediction is computed by displacing the pixel intensity value for the particular pixel based on the motion vector. When the confidence value is a relatively low value (e.g., 0), the flow or flow prediction is computed by generating the blurred version of the particular pixel to determine a neighborhood average, and displacing the blurred version of the pixel based on the motion vector to generate a compensated frame.

As described in more detail below in conjunction with FIG. 2, the compression system 130 trains the parameters of the compression model that includes the in-loop flow predictor. After training, the compression system 130 may provide components of the encoder to a sender system 110, and components of the decoder to a receiver system 140, such that the encoder and the decoder can be used to encode and decode information between the entities.

The sender system 110 is a system for encoding information and providing the encoded information to a receiver system 140 in the form of, for example, a bitstream including a sequence of bits. For example, the sender system 110 may be a server associated with a video streaming website. The receiver system 140 can decode the bitstream and reconstruct the encoded information. For example, the receiver system 140 may be a client device of a user of the video streaming website. The sender system 110 receives components of the encoder from the compression system 130 for encoding, and the receiver system 140 receives components of the decoder from the compression system 130 for decoding.

During deployment, in one embodiment, the sender system 110 encodes a sequence of one or more frames in a video by applying the encoder to the frames. Specifically, the flow predictor is applied to a set of previously reconstructed frames to generate a flow prediction for a target frame. The encoder is further configured to generate a flow code based on the flow prediction and the actual target frame that includes compressed information on the flow delta for the target frame. The flow delta can be used to refine the flow for the target frame from the flow prediction. The flow is used to generate a compensated frame and a residue frame. The encoder is further configured to generate a residue code based on the residue frame that includes compressed information on the residue frame. The sender system 110 transmits the flow code and the residue code to the receiver system 140.

The receiver system 140 receives the transmitted information from the sender system 110 and decodes a target frame by applying the decoder to the target frame. Specifically, the flow predictor is applied to the set of previously reconstructed frames to generate the flow prediction for the target frame. Responsive to receiving the transmitted flow code, the decoder is further configured to reconstruct the flow delta, and the flow delta can be used to refine the flow for the target frame. The flow can be used to generate a compensated frame for the target frame. Responsive to receiving the residue code, the decoder is further configured to reconstruct the residue frame. The decoder can then combine the compensated frame and the residue frame to generate the reconstructed version for the target frame. The reconstructed frame can be updated as the previously reconstructed frame for the next frame in the sequence, and this process can be repeated for the one or more frames of the video.

Figure 1B:
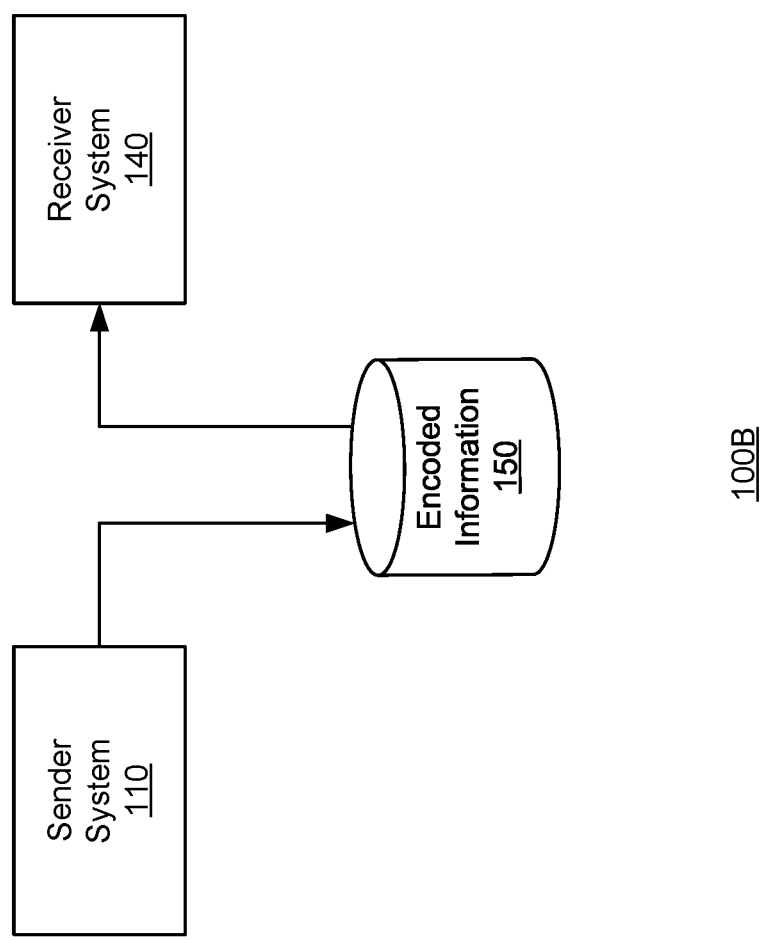
FIG. 1B is a block diagram of a system environment including a sender system and a receiver system, in accordance with another embodiment.

FIG. 1B is a block diagram of a system environment 100B including a sender system 110 and a receiver system 140, in accordance with another embodiment. The system environment 100B shown in FIG. 1B includes the sender system 110, the receiver system 140, and additionally an encoded information data store 150 that can be used to store encoded information.

In the system environment 100B of FIG. 1B, the sender system 110 encodes information and stores the encoded information in a data store 150. The receiver system 140 may retrieve the encoded information from the data store 150 to decode and generate a reconstruction. The data store 150 may represent electronic storage in the form of magnetic disks, optical disks, RAM disk, analog disks, non-volatile memory, volatile memory, and the like. The electronic storage may be a standalone storage device, or may be electronic storage integrated within a device, such as a computer or a camera. For example, responsive to a user recording a video, a sender system 110 within the camera may encode the video and store the encoded video the memory of the camera. Responsive to a request to access the video, the receiver system 140 retrieves the encoded information from memory and decodes the video to present the video to the user.

Training Process of Compression Model

Figure 2:
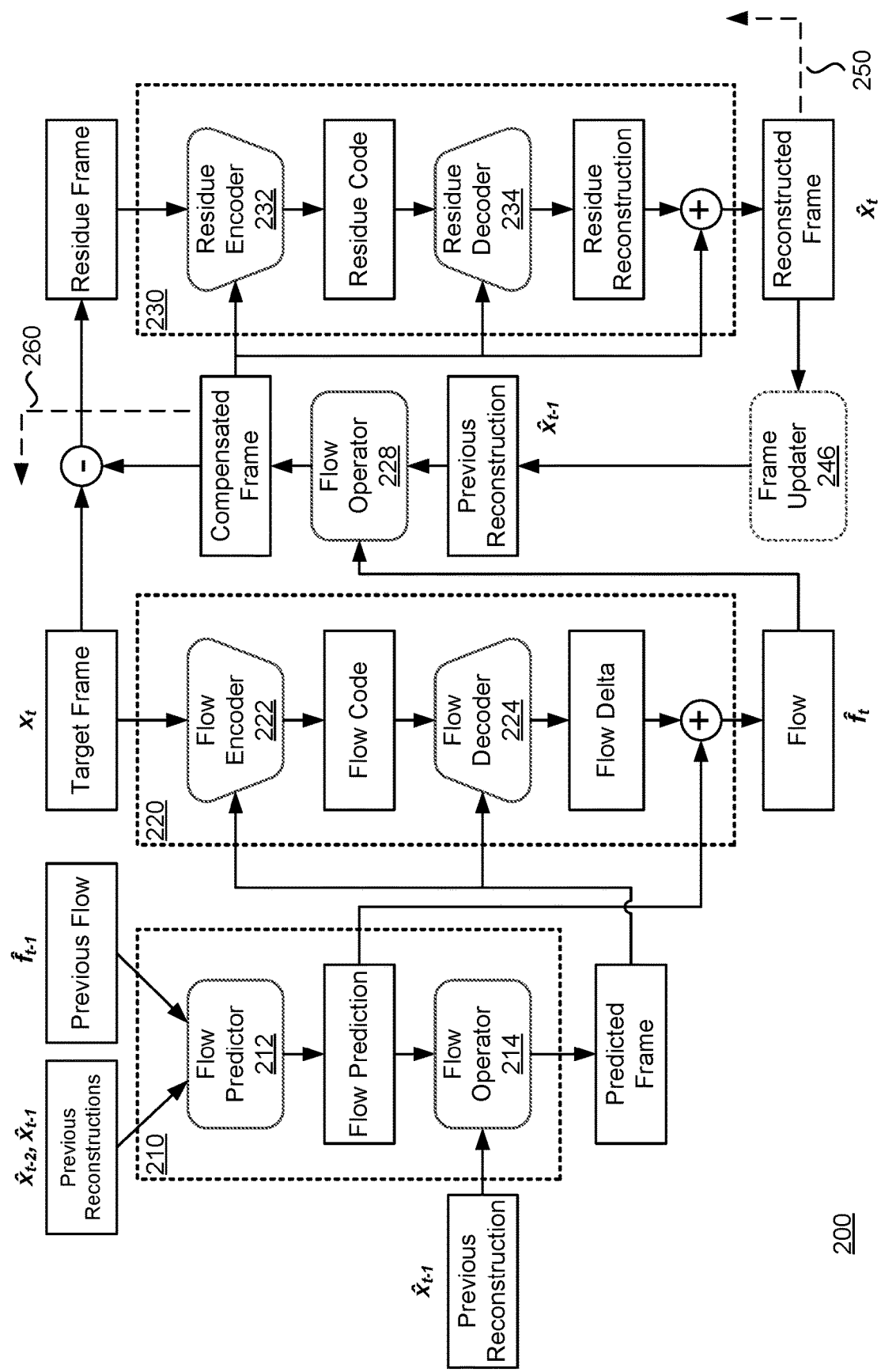
FIG. 2 illustrates a training process for the compression model, in accordance with an embodiment.

FIG. 2 illustrates a training process for the compression model 200, in accordance with an embodiment. As shown in FIG. 2, the compression model 200 includes a flow predictor block 210, a flow autoencoder 220, and a residue autoencoder 230.

Specifically, the compression model 200 shown in FIG. 2 is configured to process a sequence of data, which can be a sequence of image frames for a video, to train the parameters of the compression model 200. The compression model 200 may perform one or more iterations at a given timestep, and at each iteration, a target frame may be processed by the compression model 200 to generate a reconstructed frame for the target frame. The outputs of the compression model 200 are used to train the parameters of the compression model 200, such that components of the compression model 200 can be deployed as an encoder and/or a decoder. While the example compression model 200 shown in FIG. 2 is coupled to process one target frame at a time for ease of explanation, it should be appreciated that in other embodiments, the "target frame" can be a single frame or multiple frames, such as a group of consecutive frames, depending on the data to be encoded and decoded.

In one embodiment, the flow predictor block 210 further includes a flow predictor 212 and a flow operator 214. The flow predictor 212 is coupled to receive a set of previous reconstructed frames and a previous flow for the set of previous reconstructed frames and output the flow prediction for the target frame. As described above with respect to FIG. 1A, the set of previous reconstructed frames may include zero or more frames that were reconstructed before the target frame (e.g., two most recently reconstructed frames), and the previous flow is the flow for these set of previous reconstructed frames. The target frame may be reconstructed based on a set of previous reconstructed frames that are presented temporally earlier or after the target frame in the sequence of the video or alternatively, without a previous reconstructed frame and using only the image data of the frame itself. For example, the target frame may be encoded as a "P-frame" using flow information from a previously reconstructed frame that is placed temporally earlier in the sequence than the target frame. As another example, the target frame may be encoded as a "B-frame" using flow information from previously reconstructed frames that are placed both temporally earlier and after the target frame in the sequence. Thus, the flow prediction for a target frame is configured to be generated using information from frames that were already previously reconstructed at that time, rather than content in the current target frame.

Moreover, while the figures illustrate a flow predictor 212 that is coupled to receive a pair of previous reconstructed frames and a previous flow, this is merely an illustration, and it should be appreciated that in other embodiments, the flow predictor 212 may be configured to receive any combination of information that can be used to generate the flow prediction. For example, the flow predictor 212 can be configured to receive only the most recently reconstructed frame and/or the previous flow. As another example, the flow predictor 212 can be configured to receive only the previous flow and the flow predictor 212 can apply various techniques to estimate how the flow will change for the target frame (e.g., assuming linear motion).

The flow operator 214 is coupled to receive the flow prediction and output a predicted frame by applying the flow prediction to a previously reconstructed frame (e.g., frame reconstructed immediately before). In particular, the flow operator 214 applies the flow prediction to the previously reconstructed frame based on the type of information that the encoder is configured to encode in the flow prediction and the flow. For example, when the flow prediction and the flow is represented for each frame pixel as a concatenation of a motion vector and a pixel intensity vector, the flow operator 214, in the predicted frame, may displace the pixel by the amount indicated in the motion vector and adjust the intensity values for the pixel by the amount indicated in the pixel intensity vector. Preferably, when the flow prediction is a reasonably good estimate for the flow for the target frame, the predicted frame already closely resembles the content of the target frame.

The flow autoencoder 220 includes a flow encoder 222 and a flow decoder 224. The flow encoder 222 is coupled to receive a target frame and the predicted frame and generate a flow code. The flow decoder 224 is coupled to receive the flow code and the predicted frame and generate a flow delta for the target frame. Thus, information compressed in the flow code can be used to reconstruct the flow delta. The flow delta is used to refine the flow prediction based on the actual content of the target frame to generate the flow for the target frame. In particular, as shown in FIG. 2, the flow for a target frame is generated by combining the flow prediction with the flow delta.

The residue autoencoder 230 includes a residue encoder 232 and a residue decoder 234. The residue encoder 232 is coupled to receive a residue frame and a compensated frame and generate a residue code. In one instance, the compensated frame is generated by the flow operator 228 coupled to receive the flow for the target frame and output a compensated frame by applying the flow to the previously reconstructed frame. In particular, the flow operator 228 used to generate the compensated frame may be identical or substantially similar to the functionality provided by the flow operator 214 in the flow predictor block 210. The residue frame is generated by taking the difference between the target frame and the compensated frame. For example, the residue frame maybe generated by taking the difference in pixel intensity values between the target frame and the compensated frame for pixels at same locations in the compensated frame and the target frame.

The residue decoder 234 is coupled to receive the residue code and the compensated frame and generate a residue reconstruction for the target frame. Specifically, information compressed in the residue code can be used to reconstruct the residue frame. The residue reconstruction can be used to generate the reconstructed frame for the target frame. In particular, as shown in FIG. 2, the reconstructed frame for the target frame is generated by combining the residue reconstruction with the compensated frame. The reconstructed frame for the target frame is updated as the previously reconstructed frame for the next frame in the sequence via the frame updater 246, and thus, may also be included in the set of previous reconstructions for the next frame. The flow for the target frame is also updated as the previous flow for the next frame in the sequence via a flow updater (not shown in FIG. 2).

In one embodiment, components of the compression model 200 are configured as neural network models, such as artificial neural networks (ANN), convolutional neural networks (CNN), deep neural networks (DNN), recurrent neural networks (RNN), long short-term memory (LSTM) networks, transformer networks, and the like. Specifically, the flow predictor 212, the flow encoder 222, the flow decoder 224, the residue encoder 232, and the residue decoder 234 may be configured as any of these neural network models. In one embodiment, the flow encoder 222 and the flow decoder 224 as the flow autoencoder 220, and/or the residue encoder 232 and the residue decoder 234 as the residue autoencoder 230 may be configured as autoencoders described in U.S. patent application Ser. Nos. 15/844,424, 15/844,449, 15/844,447, or 15/844,452, all of which are incorporated by reference herein in their entirety.

During the training process of the compression model 200, the compression system 130 obtains a set of training videos. Each training video may include a sequence of frames that represent a scene over time. For example, a training video may capture a car moving down a street. The training videos may differ with each other in the scene or content that is included in the training videos.

Returning to FIG. 2, during the training process, the compression model 130 iteratively alternates between performing a forward pass step and a backpropagation step for frames in a training video. Specifically, during the forward pass step for a t-th iteration, the compression system 130 applies the flow predictor 212 to a set of previously reconstructed frames $x_{t-2}$, $x_{t-1}$ and the previous flow $\hat{f}_{t-1}$ for the set of previously reconstructed frames to generate the flow prediction for a target frame $x_t$. In particular, the set of previous reconstructions in FIG. 2 are frames $x_{t-2}$, $x_{t-1}$ that were reconstructed at an immediately previous time t-1 (e.g., reconstruction of a frame placed immediately before the target frame $x_t$), and a previous time t-2 (e.g., reconstruction of frame placed two frames before the target frame $x_t$), but it is appreciated that in other embodiments, the set of previously reconstructed frames can be any set of frames reconstructed at any time before the target frame xt. The compression system 130 applies the flow operator 214 to the flow prediction and the previous reconstruction $\hat{x}_{t-1}$ to generate a predicted frame for the target frame $x_t$.

The compression system 130 applies the flow encoder 222 to the target frame $x_t$ and the predicted frame to generate the flow code for the target frame $x_t$. The compression system 130 applies the flow decoder 224 to the flow code and the predicted frame to generate the flow delta that indicates a difference between the flow prediction and the flow for the target frame $x_t$. The flow delta is combined with the flow prediction generated by the flow predictor 210 to generate the flow $\hat{f}_t$ for the target frame $x_t$. The compression system 130 applies the flow operator 228 to the flow $\hat{f}_t$ for the target frame $x_t$ and the previous reconstruction $\hat{x}_{t-1}$ to generate the compensated frame. Also, the compression system 130 generates a residue frame by taking a difference between the target frame $x_t$ and the compensated frame.

The compression system 130 applies the residue encoder 232 to the residue frame and the compensated frame to generate the residue code for the target frame $x_t$. The compression system 130 applies the residue decoder 234 to the residue code and the compensated frame to generate the residue reconstruction that is a reconstructed version of the residue frame. The reconstructed frame $\hat{x}_t$ for the target frame $x_t$ is generated by combining the residue reconstruction with the compensated frame. Subsequently, the reconstructed frame $\hat{x}_t$ is updated as the previously reconstructed frame for the next frame $x_{t+1}$ and the flow $\hat{f}_t$ is updated as the previous flow for the next frame $x_{t+1}$. The forward pass step may be repeated for one or more subsequent frames to generate additional reconstructed frames.

The compression system 130 determines a loss function based on the results of the forward pass step. During the backpropgation step, the compression system 130 backpropagates one or more error terms obtained from the loss function to update the parameters of the compression model 200, specifically the parameters of the neural network portions of the compression model 200. The forward step and the backpropagation step are repeated for multiple iterations using a new training video(s) until a convergence criteria for the parameters is reached, at which point the training process is completed.

In one embodiment, the loss function includes a combination of a reconstruction loss and a compensated reconstruction loss. The reconstruction loss 250 indicates a difference between target frames $x_t$ and reconstructed frames $\hat{x}_t$, and thus measures the quality of reconstruction. In one instance, the reconstruction loss 250 is given by:

$$\mathcal{L}_r(x_t, \hat{x}_t; \theta) = \sum_{chw} \|x_{t,chw} - \hat{x}_{t,chw}\|^2$$

where $x_{t,chw}$ indicates pixel intensity values at position chw in the frame, $\theta$ indicates the collective set of parameters for the compression model 200, and $L_r$ indicates the reconstruction loss.

The compensated reconstruction loss 260 indicates a difference between target frames $x_t$ and compensated frames generated using the flows of the target frames $x_t$. In one instance, the compensated reconstruction loss 260 is given by:

$$\mathcal{L}_{comp}(x_t, \hat{x}_t; \theta) = \frac{1}{CHW} \sum_{chw} f_{Charb}(x_{t,chw} - F(\hat{x}_{t-1}, \hat{f}_t)_{chw})$$

where $$f_{Charb}(x) = \sqrt{x^2 + \varepsilon^2}$$

and $F(\hat{x}_{t-1}, \hat{f}_t)$ is the compensated frame generated by applying the flow $\hat{f}_t$ for the target frame to the previously reconstructed frame $\hat{x}_{t-1}$, epsilon is a constant, C is the number of channels, and H is the height and W is the width of the tensor.

Thus, by reducing a loss function that is a combination of the reconstruction loss 250 and the compensated reconstruction loss 260, the compression system 130 can train components of the compression model 130 to increase reconstruction quality for the reconstructed frame and the compensated frame. In particular, reducing the reconstruction loss 250 allows the parameters of the compression model 200 to reduce the error between a target frame and the reconstructed frame for the target frame, while reducing the compensated reconstruction loss 260 allows the parameters of the flow predictor block 210 and the flow autoencoder 220 of the compression model 200 to extract information from the target frame and the set of previous reconstructions to generate good predictions for the flow prediction and the flow for the target frame.

In one embodiment, the loss function further includes a regularization loss, in addition to either of the reconstruction loss 250 or the compensated reconstruction loss 260, that regulates the spatial gradients of the flow. In one instance, the regularization loss is given by:

$$\mathcal{L}_{regn}(\hat{f}_t) = \frac{1}{HW} \sum_{hwd} e^{-\alpha \sum_c \left|\frac{\partial x_t}{\partial d}\right|_{hw}} \left|\frac{\partial \hat{f}_t}{\partial d}\right|_{hw}$$

for a target frame, where $\hat{f}_t$ is the flow for the target frame, $\hat{x}_t$ is the reconstructed target frame, C is the number of channels, H is the height, W is the width, and D is the spatial dimension of the tensor, hw is the current height and width indices, c is the current channel, d is the current spatial dimension, and a is the loss length-scale. Increasing the regularization loss allows smoothing of flow away from boundaries in the image and to align the edges of the flow with the ones of the underlying frame. Specifically, the flow regularization loss aligns the edges of the flow with the edges in the underlying image frame by enforcing a larger regularization loss for the flow in areas of the image that are smooth.

After the parameters of the compression model 200 are trained, the compression model 130 stores the parameters of the encoder on a computer-readable medium as parameters of the encoder. In one embodiment, the encoder includes the flow predictor block 210, the flow autoencoder 220, the flow operator 228, and the residue autoencoder 230. The compression model 130 may provide the encoder to a sender system 110. The compression model 130 also stores the parameters of the decoder on a computer-readable medium as parameters of the decoder. In one embodiment, the decoder includes the flow predictor block 210, the flow decoder 224, the flow operator 228, and the residue decoder 234. The compression model 130 may provide the decoder to a receiver system 140. In other embodiments, it is appreciated that the encoder and/or the decoder can include or omit different components.

Moreover, in one embodiment, information processed by various components of the compression model may be directly interpretable with respect to the types of data it encodes in the context of video encoding and decoding. For example, an element of the flow prediction tensor generated by the flow predictor 212 in FIG. 2 may be interpreted to encode the predicted flow for a respective pixel and in the previously reconstructed frame, and an element in the residue reconstruction tensor generated by the residue decoder 234 in FIG. 2 may be interpreted to encode a residual pixel intensity value for a respective pixel in the target frame. However, it should be appreciated that information processed by a compression model is not limited hereto and can include information that is not readily interpretable in the context of video compression.

Specifically, in another embodiment, at least a part of the information processed by the compression model (e.g., any inputs or outputs of the compression model 200 of FIG. 2 or compression model 300 of FIG. 3) is represented as state information that captures and propagates information used by a neural network component to perform an assigned task. The state information for a neural network component may be uninterpretable in the sense that it can be processed by the neural network component to store and retrieve any type of information necessary for performing the task, rather than having a specific, interpretable meaning on the information. In one instance, the state information is represented as a tensor with one or more spatial dimensions.

In one example, information received or output by a component of the compression model may be configured to be at least in part or entirely composed of state information that is not necessarily associated with an imposed meaning but is used by the component to propagate any type of information that the component deems necessary for performing the assigned task. For example, the flow prediction tensor generated by the flow predictor 212 in FIG. 2 may be at least in part or entirely be composed of state information that contains data used by the flow predictor 212 to propagate any type of information that the flow predictor 212 deems necessary for predicting flow. In one instance, when information processed by the component of the compression model is represented as a tensor, at least a portion of the tensor can include interpretable information and the remaining portion of the tensor (e.g., additional channels in the tensor) may be configured as state information. For example, at least a part of the flow delta tensor output by the flow decoder 224 in FIG. 2 may include interpretable elements that encode the flow delta for each respective pixel in a target frame but can also include additional channels of state information that extract and encode information not directly interpretable by a human operator but is still useful to the residue decoder 234 or other components of the compression model 200 for the purpose of encoding and decoding videos.

Moreover, while FIG. 2 illustrates one example arrangement of the components of the compression model, it is appreciated that the compression model may have other arrangements or configurations that allow information to be processed for predicting flow and using the predicted flow to decrease the bit rate of the flow code.

Figure 3:
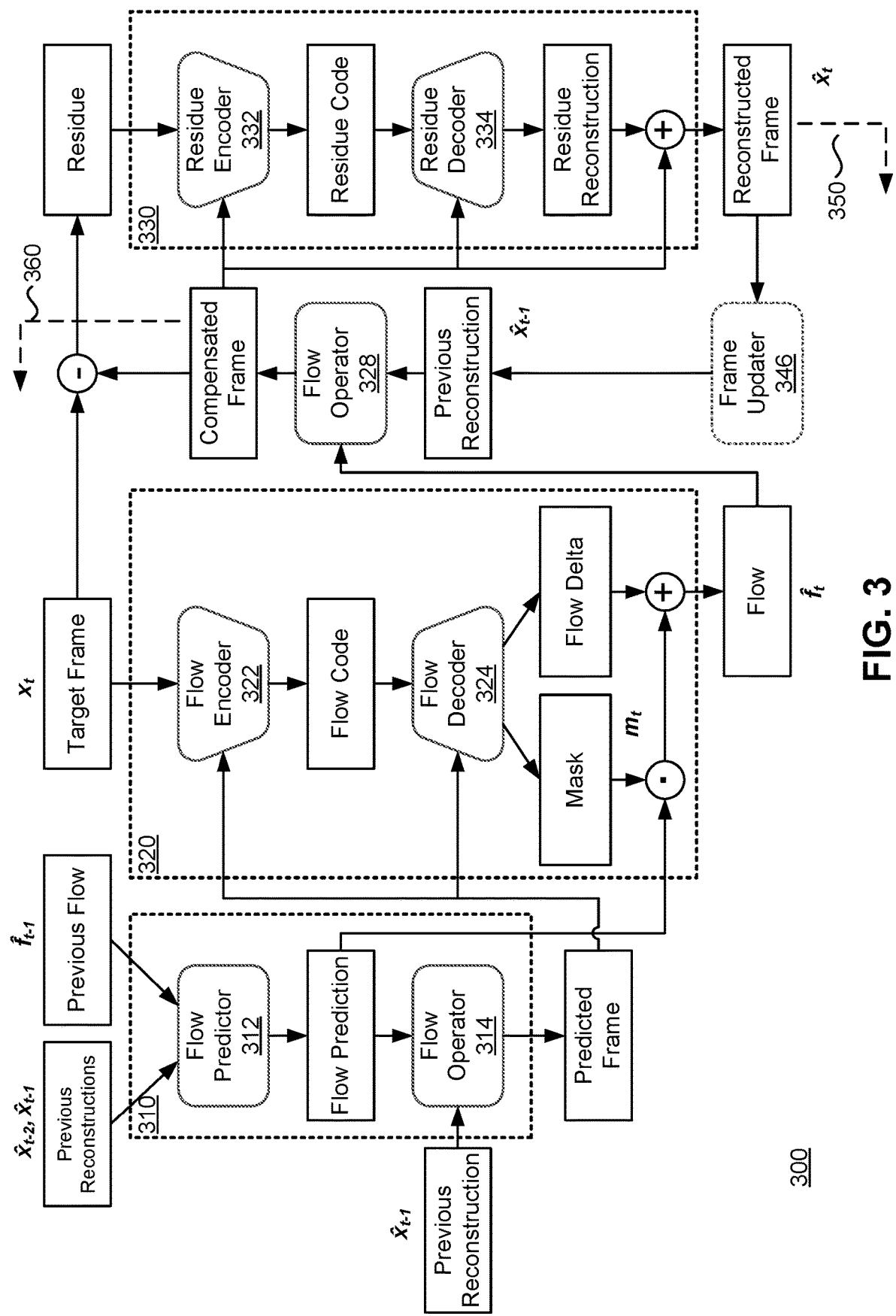
FIG. 3 illustrates a training process for the compression model, in accordance with another embodiment.

FIG. 3 illustrates a training process for the compression model 300, in accordance with another embodiment. The compression model 300 includes a flow predictor block 310, a flow autoencoder 320, and a residue autoencoder 330. The components of the compression model 300 in FIG. 3 may be substantially identical or similar to the components of the compression model 200 described in conjunction with FIG. 2, except that a flow decoder 324 in the flow autoencoder 320 is further configured to receive a flow code and a predicted frame and generate a flow delta and a mask. Specifically, the mask output by the flow decoder 324 is applied to mask one or more elements of the flow prediction, and the masked flow prediction is combined with the flow delta to generate the flow for a target frame. In one instance, elements of the mask may be binary (e.g., 0 or 1), or may be values mapped according to a sigmoid function.

The training process may also be substantially similar to that described in conjunction with the compression model 200 in FIG. 2, except that during the forward pass step, the mask $m_t$ is generated for a target frame $x_t$ in a training video along with the flow delta from the flow decoder 324. Thus, since during the backpropagation step, error terms from the loss function are backpropagated to update parameters of the flow decoder 324 and the flow encoder 322, the parameters of the flow decoder 324 and the flow encoder 322 are configured to generate a mask that effectively masks out (e.g., have values that are close to 0) for elements at locations of elements in the flow prediction that have less than optimal accuracy.

Deployment Process of Encoder and Decoder

Figure 4:
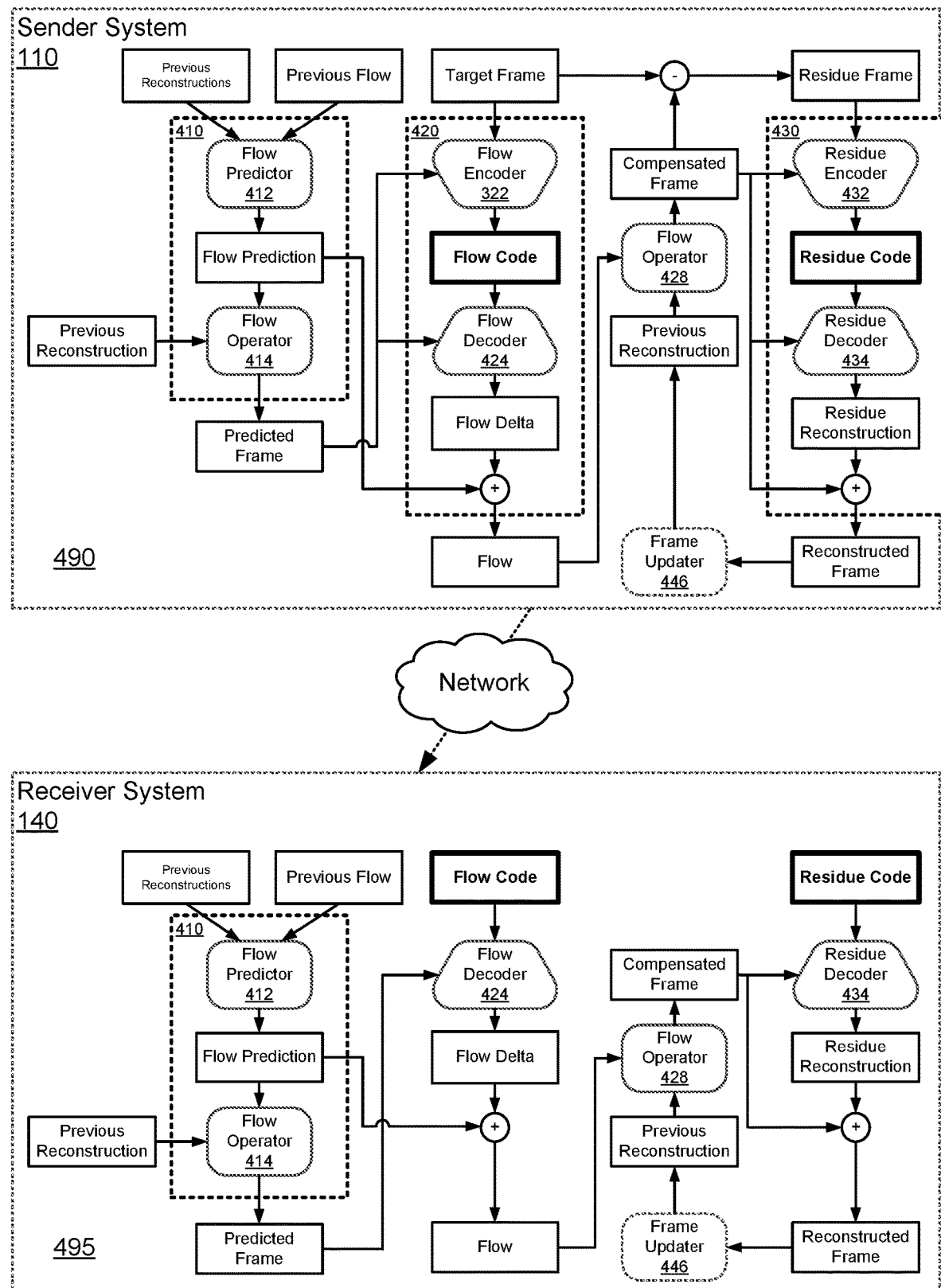
FIG. 4 illustrates a deployment process of the encoder and the decoder, in accordance with an embodiment.

FIG. 4 illustrates a deployment process of the encoder and the decoder, in accordance with an embodiment. In the example shown in FIG. 4, the sender system 110 includes an encoder 490 and the receiver system 140 includes a decoder 495. The components shown in FIG. 4 may be identical or substantially similar to those shown in the compression model 200 of FIG. 2 or the compression model 300 of FIG. 3, but may be provided to the sender system 110 and the receiver system 140 by the compression system 130 after the training process of the compression model 200.

During deployment, the sender system 110 sequentially encodes a sequence of image frames for a video using the encoder 490. Specifically, FIG. 4 illustrates the encoding process for the t-th target frame in the video. The sender system 110 applies the flow predictor 412 to a set of previously reconstructed frames and a previous flow to generate a flow prediction for the target frame. The sender system 110 applies the flow operator 414 to the flow prediction and a previous reconstructed frame to generate the predicted frame. The sender system 110 applies the flow encoder 422 to the target frame and the predicted frame to generate a flow code. The sender system 110 applies the flow decoder 324 to the flow code and the predicted frame to generate the flow delta. The sender system 110 generates a flow for the target frame by combining the flow delta with the flow prediction.

The sender system 110 applies the flow operator 428 to the flow for the target frame and the previous reconstruction to generate the compensated frame. The sender system 110 applies the residue encoder 432 to the residue frame and the compensated frame to generate a residue code. The sender system 110 applies the residue decoder 434 to the previous reconstruction to generate the residue reconstruction. The sender system 110 generates the reconstructed frame by combining the residue reconstruction and the compensated frame. The reconstructed frame can be updated as the previous reconstruction for the next frame. The sender system 110 transmits the flow code and the residue code (bolded in FIG. 4) to the receiver system 140. This process may be repeated for the next frame onward.

The receiver system 140 receives the flow code and the residue code from the sender system 110. The receiver system 140 applies the flow predictor 412 to the set of previously reconstructed frames and the previous flow to generate a flow prediction for the target frame. The receiver system 140 applies the flow operator 414 to the flow prediction and the previous reconstruction to generate a predicted frame. Thus, since the decoder includes the machine-learned flow predictor block 410, the receiver system 140 can generate a flow prediction and thus, a predicted frame that is a good estimate for the target frame before data on the target frame is transmitted by the sender system 110.

The receiver system 140 applies the flow decoder 424 to the transmitted flow code and the predicted frame to generate the flow delta. The receiver system 140 combines the flow delta and the flow prediction to generate the flow for the target frame. The receiver system 140 applies the flow operator 428 to the previous reconstruction and the flow to generate a compensated frame. The receiver system 140 applies the residue decoder 434 to the transmitted residue code and the compensated frame to generate a residue reconstruction. The receiver system 140 combines the residue reconstruction and the compensated frame to generate the reconstructed frame for the target frame. The receiver system 140 may repeat this process for the next frame onward as the flow code and the residue code for the next frame is transmitted from the sender system 110.

In one embodiment, the flow decoder 424 is further configured to generate a mask for masking one or more elements of the flow prediction for the target frame, as described in detail in conjunction with FIG. 3. In such an embodiment, the flow decoder 424 may further generate the mask for the target frame during the deployment process. The flow prediction may be modified by taking, for example, a Hessian product between the mask and the flow prediction to mask one or more elements in the flow prediction. The flow for the current frame can then be generated by combining the flow delta with the modified flow prediction.

Method of Deploying Encoder and Decoder

Figure 5:
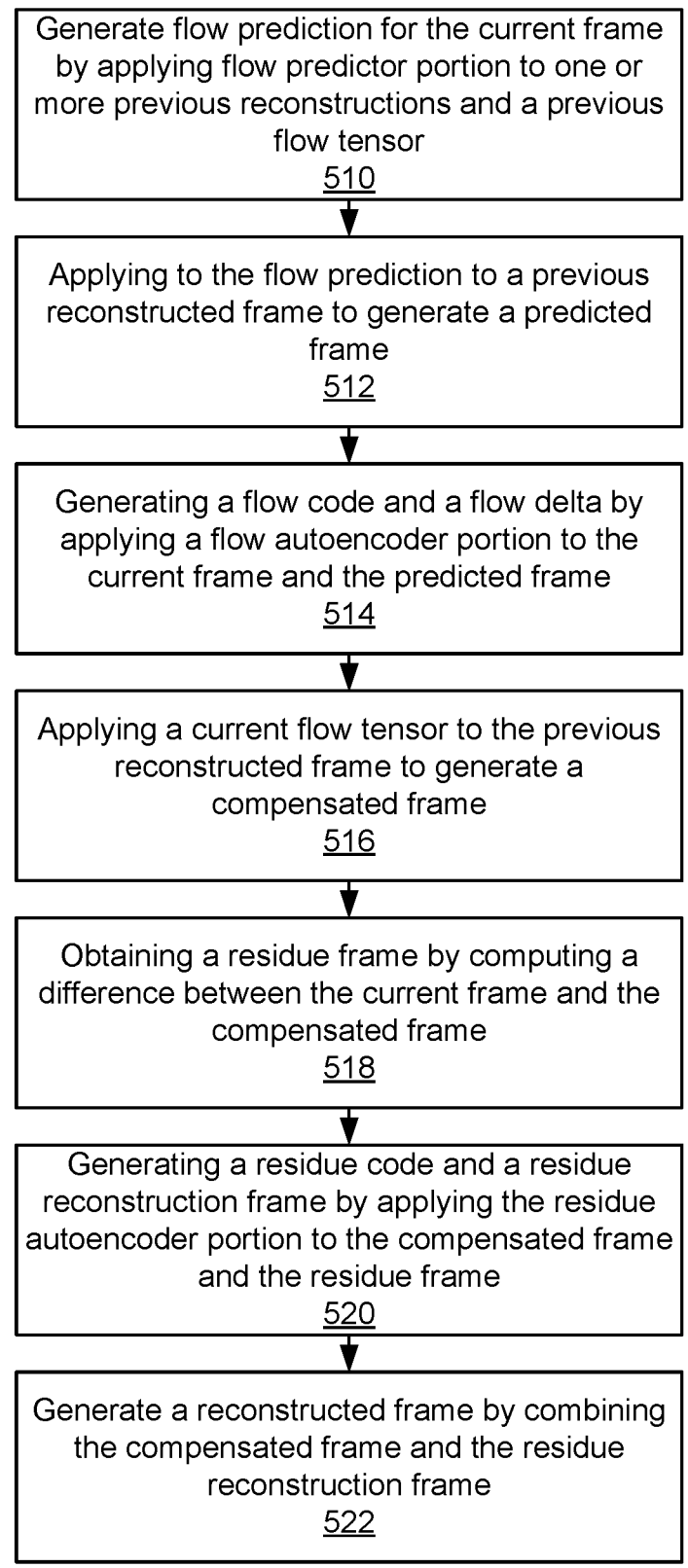
FIG. 5 is a flowchart illustrating a deployment process of the encoder, in accordance with an embodiment.

FIG. 5 is a flowchart illustrating a deployment process of the encoder, in accordance with an embodiment. In one embodiment, the steps shown in FIG. 5 may be performed by the sender system 110 using the encoder.

The sender system 110 accesses a machine-learned encoder including a flow predictor portion, a flow autoencoder portion, and a residue autoencoder portion. For each frame in a sequence of one or more frames, the sender system 110 generates 510 a flow prediction for the current frame by applying the flow predictor portion to one or more previous reconstructed frames and a previous flow tensor. The sender system 110 applies 512 the flow prediction to a previous reconstructed frame to generate a predicted frame for the current frame. The sender system 110 generates 514 a flow code and a flow delta by applying the flow autoencoder portion to the current frame and the predicted frame. The sender system 110 applies 516 a current flow tensor that is a combination of the flow prediction and the flow delta to the previous reconstructed frame to generate a compensated frame for the current frame. The sender system obtains 518 a residue frame by computing a difference between the current frame and the compensated frame. The sender system 110 generates 520 a residue code and a residue reconstruction frame by applying the residue autoencoder portion to the compensated frame and the residue frame. The sender system 110 generates 522 a reconstructed frame by combining the compensated frame and the residue reconstruction frame. The sender system 110 updates the reconstructed frame for the current frame as the previous reconstructed frame, and the current flow tensor as the previous flow tensor for the next frame in the iteration.

Figure 6:
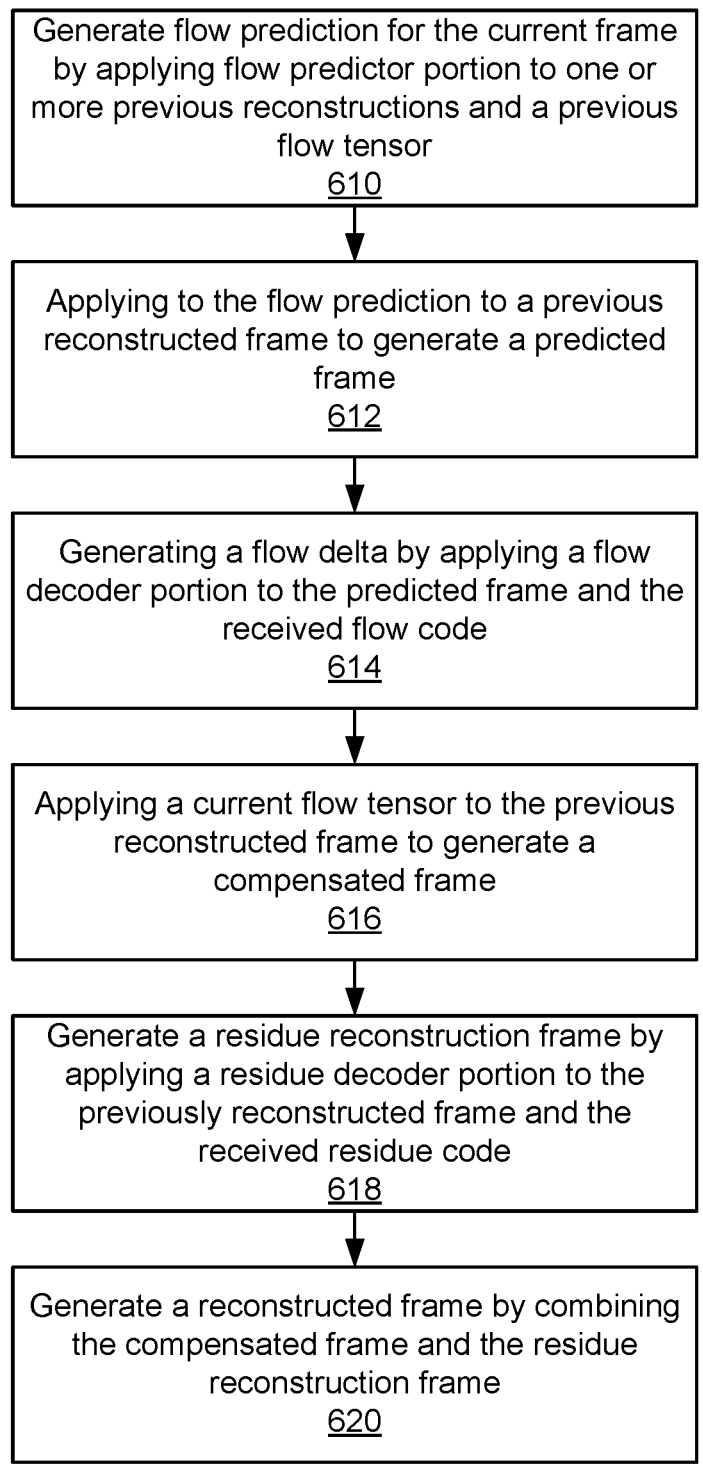
FIG. 6 is a flowchart illustrating a deployment process of the decoder, in accordance with an embodiment.

FIG. 6 is a flowchart illustrating a deployment process of the encoder, in accordance with an embodiment. In one embodiments, the steps shown in FIG. 6 may be performed by the receiver system 140 using the decoder.

The decoder system 140 accesses a machine-learned decoder including a flow predictor portion, a flow decoder portion, and a residue decoder portion. For each frame in a sequence of one or more frames, the receiver system 140 generates 610 a flow prediction for the current frame by applying the flow predictor portion to one or more previous reconstructed frames and a previous flow tensor. The receiver system 140 applies 612 the flow prediction to a previous reconstructed frame to generate a predicted frame for the current frame. The receiver system 140 generates 614 a flow delta by applying the flow decoder portion to the predicted frame and flow code received from, for example, the sender system 110. The receiver system 140 applies 616 a current flow tensor that is a combination of the flow prediction and the flow delta to the previous reconstructed frame to generate a compensated frame for the current frame. The receiver system 140 generates 618 a residue reconstruction frame by applying a residue decoder portion to the previously reconstructed frame and residue code received from, for example, the sender system 110. The receiver system 140 generates 620 generates a reconstructed frame for the target frame by combining the residue reconstruction frame with the compensated frame. The receiver system 140 updates the reconstructed frame for the current frame as the previous reconstructed frame, and the current flow tensor as the previous flow tensor for the next frame in the iteration.

The processes described in FIGS. 5 and 6 are merely illustrative. Various additional steps may be added, and certain steps may be omitted from the step depending on the structure and function of the processing nodes.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of encoding a video including a sequence of one or more frames, the method comprising:
    accessing a machine-learned encoder including a flow predictor portion, a flow autoencoder portion, and a residue autoencoder portion, wherein at least a portion of the machine-learned encoder is configured as a neural network with a set of parameters; and
    iteratively performing, for each frame in the sequence of one or more frames:
        generating a flow prediction for the current frame by applying the flow predictor portion to zero or more previous reconstructed frames and a previous flow tensor, the flow predictor portion configured as a neural network,
        applying the flow prediction to a previous reconstructed frame to generate a predicted frame for the current frame,
        generating a flow code and a flow delta by applying the flow autoencoder portion to the current frame and the predicted frame, wherein the flow autoencoder portion includes a flow encoder and a flow decoder each configured as a neural network, and wherein applying the flow autoencoder portion comprises:
            applying the flow encoder to the current frame and the predicted frame to generate the flow code, and
            applying the flow decoder to the flow code or the predicted frame to generate the flow delta,
        applying a current flow tensor that is a combination of the flow prediction and the flow delta to the previous reconstructed frame to generate a compensated frame for the current frame,
        obtaining a residue frame by computing a difference between the current frame and the compensated frame,
        generating a residue code and a residue reconstruction frame by applying the residue autoencoder portion to the compensated frame and the residue frame,
        generating a reconstructed frame by combining the compensated frame and the residue reconstruction frame, and
        updating the reconstructed frame for the current frame as the previous reconstructed frame, and the current flow tensor as the previous flow tensor.

2. The method of claim 1, wherein the flow prediction represents motion displacement of a block of pixels from the previous reconstructed frame to a respective block in the current frame, and applying the flow prediction to the previous reconstructed frame to generate the predicted frame comprises changing a location of the block of pixels in the previous reconstructed frame to a location in the predicted frame based on values of the flow prediction.

3. The method of claim 1, wherein the flow prediction represents motion displacement of a block of pixels from the previous reconstructed frame to a respective block in the current frame and a confidence value associated with the motion displacement, and applying the flow prediction to the previous reconstructed frame to generate the predicted frame comprises:
    generating a blurred version of the block of pixels, wherein a degree of blurring is based on the confidence value of the motion displacement, and
    displacing a location of the blurred version of the block of pixels in the previous reconstructed frame to a respective location in the predicted frame.

4. The method of claim 1, wherein the flow prediction represents changes in pixel intensity values for one or more pixels from the previous reconstructed frame to the current frame, and applying the flow prediction to the previous reconstructed frame to generate the predicted frame comprises modifying the pixel intensity values for the one or more pixels in the previous reconstructed frame based on values of the flow prediction.

5. The method of claim 1, further comprising applying the flow decoder to generate a mask for masking one or more elements of the flow prediction.

6. The method of claim 5, further comprising modifying the one or more elements of the flow prediction according to the mask, and wherein the current flow tensor is a combination of the modified flow prediction and the flow delta.

7. The method of claim 1, wherein the residue autoencoder portion includes a residue encoder and a residue decoder, and wherein applying the residue autoencoder portion further comprises applying the residue encoder to the residue frame and the compensated frame to generate the residue code, and applying the residue decoder to the residue code and the compensated frame to generate the residue reconstruction frame.

8. The method of claim 1, wherein at least one of an input or output of a component of the flow predictor portion, the flow autoencoder portion, or the residue autoencoder portion is represented as a tensor, and at least a portion of the tensor includes state information.

9. A method of decoding a video including a sequence of one or more frames, the comprising:

accessing a machine-learned decoder including a flow predictor portion, a flow decoder portion, and a residue decoder portion, wherein at least a portion of the machine-learned decoder is configured as a neural network with a set of parameters; and iteratively performing, for each frame in the sequence of one or more frames:

generating a flow prediction for the current frame by applying the flow predictor portion to zero or more previous reconstructed frames and a previous flow tensor, applying the flow prediction to a previous reconstructed frame to generate a predicted frame for the current frame, generating a flow delta by applying the flow decoder portion configured as a neural network to the predicted frame and a flow code, wherein the flow code is generated by a flow encoder configured as a neural network, applying a current flow tensor that is a combination of the flow prediction and the flow delta to the previous reconstructed frame to generate a compensated frame for the current frame, generating a residue reconstruction frame by applying the residue decoder portion to the compensated frame and a residue code, generating a reconstructed frame by combining the compensated frame and the residue reconstruction frame, and updating the reconstructed frame for the current frame as the previous reconstructed frame, and the current flow tensor as the previous flow tensor.

10. The method of claim 9, wherein the flow prediction represents motion displacement of a block of pixels from the previous reconstructed frame to a respective block in the current frame, and applying the flow prediction to the previous reconstructed frame to generate the predicted frame comprises changing a location of the block of pixels in the previous reconstructed frame to a location in the predicted frame based on values of the flow prediction.

11. The method of claim 9, wherein the flow prediction represents motion displacement of a block of pixels from the previous reconstructed frame to a respective block in the current frame and a confidence value associated with the motion displacement, and applying the flow prediction to the previous reconstructed frame to generate the predicted frame comprises:

generating a blurred version of the block of pixels, wherein a degree of blurring is based on the confidence value of the motion displacement, and displacing a location of the blurred version of the block of pixels in the previous reconstructed frame to a respective location in the predicted frame.

12. The method of claim 9, wherein the flow prediction represents changes in pixel intensity values for one or more pixels from the previous reconstructed frame to the current frame, and applying the flow prediction to the previous reconstructed frame to generate the predicted frame comprises modifying the pixel intensity values for the one or more pixels in the previous reconstructed frame based on values of the flow prediction.

13. The method of claim 9, further comprising receiving the flow code and the residue code from an encoder.

14. The method of claim 9, further comprising applying the flow decoder to generate a mask for masking one or more elements of the flow prediction.

15. The method of claim 14, further comprising modifying the one or more elements of the flow prediction according to the mask, and wherein the current flow tensor is a combination of the modified flow prediction and the flow delta.

16. The method of claim 9, wherein at least one of an input or output of a component of the flow predictor portion, the flow decoder portion, or the residue decoder portion is represented as a tensor, and at least a portion of the tensor includes state information.

* * * * *